United States Patent

[15] 3,706,852
[45] Dec. 19, 1972

Angus

[54] QUIET TURN-ON CIRCUIT FOR CARBON MICROPHONES

[72] Inventor: Alexander C. Angus, Bedford, N.H.
[73] Assignee: McGraw-Edison Company, Elgin, Ill.

[22] Filed: Jan. 4, 1971
[21] Appl. No.: 103,567

[52] U.S. Cl. .................179/1 A, 179/81 B, 325/150, 325/170, 330/141
[51] Int. Cl. .........H04b 1/04, H04b 1/02, H03g 3/20
[58] Field of Search .......179/1 A, 1 MF, 1 VC, 84 B, 179/81 B; 325/150, 170; 330/141, 149

[56] References Cited

UNITED STATES PATENTS

| | | | |
|---|---|---|---|
| 3,595,998 | 7/1971 | Fidi | 179/1 A |
| 3,244,997 | 4/1966 | Wruk | 330/141 |
| 3,365,546 | 1/1968 | Kemper | 325/170 |
| 3,305,638 | 2/1967 | Teachout | 179/1 A |

*Primary Examiner*—Kathleen H. Claffy
*Assistant Examiner*—William A. Helvestine
*Attorney*—George H. Fritzinger

[57] ABSTRACT

A preamplifier for a carbon microphone is provided at its input with a field effect transistor biased to a non-conductive state. When the microphone switch is turned on to connect the microphone to the amplifier the source of the bias is substantially cut off but an RC delay circuit is provided to maintain the bias momentarily to keep the amplifier inoperative until the rush of current through the microphone subsides so that the usual "click" sound is not heard when the microphone is turned on.

4 Claims, 1 Drawing Figure

PATENTED DEC 19 1972 3,706,852
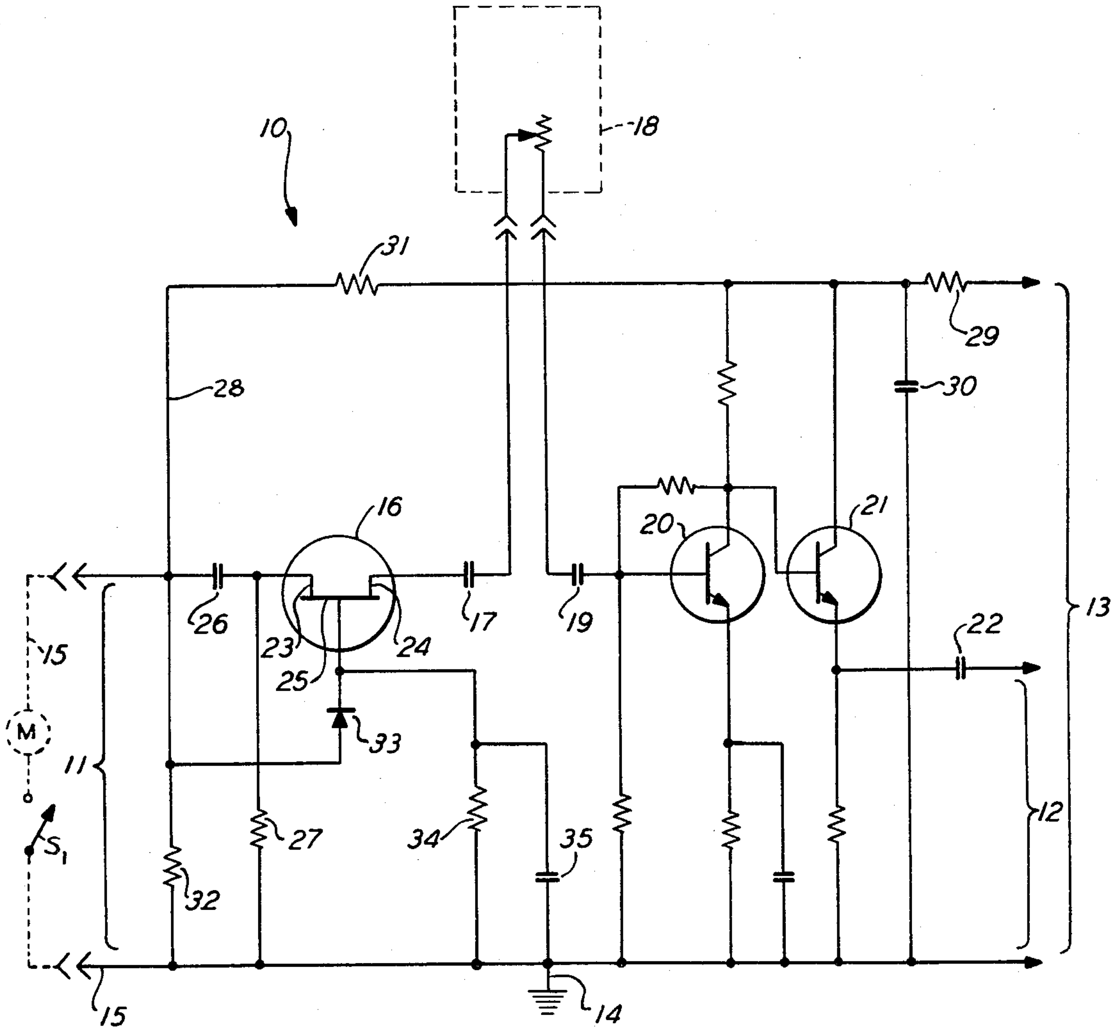
INVENTOR.
ALEXANDER C. ANGUS
BY George H. Fritzinger
AGENT

QUIET TURN-ON CIRCUIT FOR CARBON MICROPHONES

An object of the invention is to provide a novel solid state circuit for circumventing the usual "click" sound produced when a carbon microphone is connected to a communication circuit.

Another object is to provide a preamplifier for a carbon microphone, which has a field effect transistor at its input normally biased into a non-conductive state but wherein the bias is reduced with a delayed action when the microphone is turned on so that the amplifier is maintained inoperative until the initial rush of current through the microphone subsides.

Another object is to provide such preamplifier for carbon microphones wherein a voltage divider circuit provides the normal bias to render the amplifier inoperative and a parallel RC circuit is connected through a rectifier across the bias resistor to maintain the bias on the gate of the transistor momentarily after the carbon microphone is connected to the input of the transistor.

These and other objects and features of the invention will be apparent from the following description and the appended claims.

In the description of my invention reference is had to the accompanying schematic circuit diagram showing a preamplifier for a carbon microphone according to the invention.

A preamplifier 10 has an input circuit 11, an output circuit 12 and a voltage supply circuit 13 each of which has a common ground 14. Connectable across the input circuit through a switch $S_1$ via a circuit 15 is a carbon microphone M. The d. c. source for the voltage supply circuit 13 and the apparatus into which the output circuit 12 is connected need not be herein shown for purposes of the invention.

The preamplifier has a field effect transistor 16 connected to its input which feeds via a condenser 17, gain control device 18 and condenser 19 to an NPN type transistor 20. This transistor 20 in turn feeds into another NPN type transistor 21. Both NPN transistors are amplifier transistors typically of the type 2N 3391A. The transistor 21 feeds through a coupling condenser 22 to the output circuit 12. The invention herein deals especially with the circuitry associated with the input field effect transistor 16 and therefore only this portion of the preamplifier is herein further described.

The transistor 16 has a source electrode 23 and a drain electrode 24 both associated with a gate electrode 25. The input circuit 11 is connected to the source electrode 23 through an isolating condenser 26 and across a load resistor 27 connected between the source electrode 23 and ground. A d. c. bias voltage typically three volts is supplied to the gate electrode 25 from the voltage supply circuit 13 through a voltage divider circuit 28 serially including a filter resistor 29 associated with a shunt condenser 30, a voltage cut-down resistor 31 and a bias resistor 32 connected across the input circuit 11. The bias voltage is led to the gate electrode 25 via a rectifier 33 to bias the transistor 16 so that it has normally a high impedance rendering it essentially non-conductive. The microphone circuit 15 has a resistance relatively low compared to that of the bias resistor 32 with the result that when the switch $S_1$ is closed the bias voltage is reduced to render the transistor 16 conductive — i. e., the amplifier operative. This is an instantaneous conditioning of the transistor which would enable the amplifier to respond to the initial in-rush of current through the microphone M when the switch $S_1$ is closed. Such in-rush or transient flow of current produces the usual "click" sound when the microphone is turned on.

By the present invention the "click" sound is averted without losing any of the intelligence to be transmitted from the microphone to the amplifier. This is accomplished by delaying the restoration of the amplifier to operative condition after the switch $S_1$ is closed for only such fraction of a second as it takes the initial transients to subside — typically one—fourth second or less. This delay is accomplished simply by connecting a parallel RC circuit including a resistor 34 and condenser 35 between the gate electrode 25 and ground. When the switch $S_1$ is open allowing a bias voltage to be produced across the bias resistor 32, the bias voltage is applied also across the RC circuit 34-35 through the rectifier 33 to charge the condenser 35 to the same bias voltage. When the bias voltage across the resistor 32 is cut off by closing the switch $S_1$ the condenser 35 holds momentarily its charge since it cannot be discharged through the resistor 32 via the rectifier 33 and will discharge therefore only through the resistor 34 at the time rate established by the RC time constant of the circuit. Thus, the transistor 16 is retained in a non-conductive condition for only such initial time after the switch $S_1$ is closed as is required to allow the transient in-rush of current to the microphone to subside whereby to avoid the "click" sound.

The description of my invention is herein intended to be illustrative and not necessarily limitative of the invention since the same can be changed or modified in details within the scope of the invention as is herein claimed.

I claim:

1. A preamplifier for a carbon microphone having an input circuit with a transistor device the conductivity of which is responsive to a bias voltage across said input circuit, circuit means including a microphone switch for connecting said input circuit to said microphone, a voltage divider circuit including a resistor across said input circuit across which a bias voltage is developed when said microphone switch is in "off" position causing an attenuation of the gain of said preamplifier, said circuit means having a low resistance causing a substantial decrease in said bias and restoration of said gain when said microphone switch is thrown to on position, and a delay circuit associated with said bias circuit to prevent an instantaneous change in the gain of said amplifier arising from said decrease of said bias when said switch is turned on whereby the surge of current to the microphone when the switch is turned on is not amplified.

2. The preamplifier set forth in claim 1 wherein said preamplifier has an input field effect transistor operating as a switch which in the absence of an input bias voltage has a low internal impedance and which with a preset input bias voltage has a high impedance simulating an open switch condition.

3. The amplifier set forth in claim 2 wherein said delay circuit comprises an RC parallel circuit connected between the gate of said transistor and ground, and a rectifier connecting said bias resistor to said gate for causing the bias resistor to charge said RC circuit when said switch is in off position and said RC circuit to maintain momentarily the bias on said gate after collapse of the bias voltage across said resistor when said switch is turned on.

4. A preamplifier for a carbon microphone having a field effect input transistor, a switch for connecting said microphone to the input of said amplifier, an isolating condenser connecting said input to the source terminal of said transistor, a voltage divider including a resistor connected across the input of said amplifier and ground, a rectifier connecting said resistor to the gate of said transistor for providing a bias on said gate to render the transistor normally non-conductive, said microphone circuit via said switch having a low resistance effectively shunting said resistor and reducing the bias across said resistor to render said transistor conducting when said switch is closed, and a parallel RC circuit connected between said gate and ground normally charged to the bias voltage across said resistor via said rectifier when said switch is off, said rectifier preventing discharge of said RC circuit through said resistor when the bias voltage across said resistor is reduced by the turning of said switch to on position whereby the RC circuit maintains the bias on said gate for the time duration of discharge of said RC circuit.

* * * * *